(12) United States Patent
Weber et al.

(10) Patent No.: US 9,227,602 B2
(45) Date of Patent: Jan. 5, 2016

(54) DISC BRAKE FOR A COMMERCIAL VEHICLE

(71) Applicant: KNORR-BREMSE Systeme fuer Nutzfahrzeuge GmbH, Munich (DE)

(72) Inventors: Ralf Weber, Munich (DE); Matthias Klingner, Moorenweis (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 14/249,862

(22) Filed: Apr. 10, 2014

(65) Prior Publication Data

US 2014/0216863 A1 Aug. 7, 2014

Related U.S. Application Data

(63) Continuation of application No. PCT/EP2012/069656, filed on Oct. 4, 2012.

(30) Foreign Application Priority Data

Oct. 10, 2011 (DE) .......................... 10 2011 115 464

(51) Int. Cl.
| | |
|---|---|
| *F16D 65/18* | (2006.01) |
| *F16D 65/56* | (2006.01) |
| *B60T 1/06* | (2006.01) |
| *F16D 121/14* | (2012.01) |
| *F16D 125/32* | (2012.01) |

(52) U.S. Cl.
CPC .............. *B60T 1/065* (2013.01); *F16D 65/183* (2013.01); *F16D 65/568* (2013.01); *F16D 2121/14* (2013.01); *F16D 2125/32* (2013.01)

(58) Field of Classification Search
CPC ..... F16D 65/46; F16D 65/567; F16D 65/568; F16D 65/183
See application file for complete search history.

(56) References Cited

U.S. PATENT DOCUMENTS

| | | | | |
|---|---|---|---|---|
| 4,721,190 A | * | 1/1988 | Schmidt et al. | 188/71.9 |
| 5,353,896 A | | 10/1994 | Baumgartner et al. | |
| 7,101,296 B1 | * | 9/2006 | Cass et al. | 474/152 |

FOREIGN PATENT DOCUMENTS

| | | |
|---|---|---|
| DE | 40 34 165 A1 | 12/1991 |
| DE | 40 20 189 A1 | 1/1992 |

(Continued)

OTHER PUBLICATIONS

International Preliminary Report on Patentability (PCT/IB/326) and (PCT/IB/373) dated Apr. 24, 2014, including Written Opinion (PCT/ISA/237) (eleven (11) pages).

(Continued)

*Primary Examiner* — Anna Momper
(74) *Attorney, Agent, or Firm* — Crowell & Moring LLP

(57) ABSTRACT

A disc brake for a commercial vehicle includes a brake caliper that straddles a brake disc, a brake application device, arranged in the brake caliper, for pressing brake pads against the brake disc. Two parallel, spaced-apart adjusting spindles are mounted in a rotatable manner via a corresponding thread, in a bridge of the brake application device. A wear adjusting device is arranged in the brake caliper and compensates for a wear-related change in the clearance between the brake pad and the brake disc by axially moving the adjusting spindles. A synchronizing device includes a traction drive mechanism which allows the two adjusting spindles to be synchronously rotated. The fraction drive mechanism has a traction mechanism that meshes in a force transmitting manner with drive gears which are effectively connected to the adjusting spindles for conjoint rotation therewith. Each drive gear includes at least one form-fitting element which engages with an outer axial guide of the associated adjusting spindle.

12 Claims, 2 Drawing Sheets

(56) References Cited

FOREIGN PATENT DOCUMENTS

| DE | 87 18 084 U1 | 1/1994 |
| DE | 94 22 342 U1 | 4/2000 |

OTHER PUBLICATIONS

International Search Report with English translation dated Feb. 4, 2013 (8 pages).

* cited by examiner

DISC BRAKE FOR A COMMERCIAL VEHICLE

CROSS REFERENCE TO RELATED APPLICATIONS

This application is a continuation of PCT International Application No. PCT/EP2012/069656, filed Oct. 4, 2012, which claims priority under 35 U.S.C. §119 from German Patent Application No. 10 2011 115 464.0, filed Oct. 10, 2011, the entire disclosures of which are herein expressly incorporated by reference.

BACKGROUND AND SUMMARY OF THE INVENTION

The invention relates to a disc brake for a commercial vehicle.

In a disc brake, which is known from DE 94 22 342 U1, a rotary lever acts on a bridge which is positioned in a brake caliper and in which two adjusting spindles are mounted. Each adjusting spindle includes a pressure piece for receiving a brake pad. The brake pad consists of a pad carrier plate and a friction pad fastened thereto. The brake pad is pressed onto a brake disc in the case of a braking operation. The two adjusting spindles are provided with an external thread and are screwed in each case into a respective threaded bore of the bridge.

By way of a wear adjusting device which is assigned to one of the adjusting spindles, the brake pad is applied, as a result of rotation of the adjusting spindles in the threaded bores, in the case of wear of the friction pad, such that an air gap between the brake pad and the brake disc always remains substantially constant. To this end, an adjuster which is arranged concentrically in one of the adjusting spindles is driven via a drive element by the rotary lever.

Since, however, the adjuster is positioned merely in one adjusting spindle, but the adjustment of the brake pad is to take place uniformly and the second adjusting spindle therefore also has to be adjusted correspondingly, a preferably positively locking traction mechanism drive is provided, which transmits the rotational movement of one adjusting spindle to the other synchronously. For example, a link chain which is guided in a circulating manner on chain sprockets of the adjusting spindles is used as traction mechanism. The use of a toothed belt which is then in engagement with gearwheels is also known.

However, the known constructions all have the disadvantage that the traction mechanism drive, that is to say the synchronizing device, is arranged outside the brake caliper, a closure cover which covers the synchronizing device usually being provided, in order to both protect the synchronizing device against weather influences and to seal passage openings in the brake caliper toward the adjusting spindles.

In order to fasten it, but also in order to seal it with respect to the brake caliper, relatively complicated measures are required, which can be realized only with correspondingly expensive production steps.

Moreover, the synchronizing device and the closure cover which covers it add height to the brake caliper and therefore conflict with the constant requirement for minimization of the overall brake dimensions.

The invention is based on the object of developing a disc brake of the above-described type such that it can be produced more simply and less expensively, and its dimensions are minimized.

This and other objects are achieved by way of a disc brake having a brake caliper which engages over a brake disc, a brake application device which is arranged in the brake caliper for pressing brake pads onto the brake disc, two adjusting spindles which are arranged parallel to one another and at a spacing from one another and are mounted rotatably by way of a corresponding thread in a bridge, on which a rotary lever of the brake application device acts, a wear adjusting device which is positioned in the brake caliper and by way of which a wear-induced change in an air gap between the brake pad and the brake disc can be compensated for substantially via an axial adjustment of the adjusting spindles, and a synchronizing device with a traction mechanism drive, by way of which the two adjusting spindles can be adjusted synchronously. The fraction mechanism drive has a traction mechanism which acts in a force-transmitting manner on drive wheels which are in operative connection with the adjusting spindles such that they cannot rotate. Each drive wheel has at least one positively locking element, which acts on an outer-side axial guide of the associated adjusting spindle.

The possibility of extraordinarily space-saving accommodation is provided by way of the configuration according to the invention of the adjusting or synchronizing device. This permits an arrangement of the synchronizing device inside the brake caliper. The arrangement suitably takes place on that side of the bridge which faces the brake pad, since the rotary lever bears against the bridge on the opposite side.

Otherwise, the adjusting spindles protrude out of the bridge in the direction of the brake pad, that is to say in the direction of the connected pressure pieces, as a result of which sufficient space remains for positioning the drive wheels which are mounted rotatably on integrally formed attachments of the bridge.

As a result of the accommodation of the synchronizing device inside the brake caliper, the brake caliper and/or the disc brake is not only more compact overall, but the use of an external closure cover can also be dispensed with, as well as previously necessary sealing measures in the brake caliper with respect to the closure cover.

In this way, cost savings which are certainly notable, can naturally be achieved which, above all, are also significant because disc brakes are produced as serial parts in large numbers.

In addition to the purely structural advantages, which also include the fact that a potentiometer which is necessary for wear detection can be arranged inside the brake caliper, functional advantages are also achieved. These include, in particular, the possibility of already carrying out the synchronization of the two adjusting spindles before complete assembly of the brake.

To this end, each drive wheel is configured in two pieces, consisting of an outer wheel, into which the traction mechanism engages, and an inner wheel. The outer wheel and inner wheel are held with respect to one another such that they cannot rotate by way of a toothing system which engages into one another.

Whereas the outer wheel has an external toothing system with a relatively coarse tooth spacing for the positively locking connection to the traction mechanism, for example a link chain or a toothed belt, the tooth spacing of the corresponding outer wheel/inner wheel toothing system is kept fine, that is to say small, with the result that very accurate presetting of the adjusting spindles is possible.

The at least one positively locking element according to the invention, by way of which the respective drive wheel is held on the associated adjusting spindle such that it cannot rotate, but is displaceable axially, can consist of a ball, a feather key or a comparable component which is held in the drive wheel. The positively locking element is guided on an outer-side axial guide, preferably in an axial groove or on a guide face of the adjusting spindle. A ball is highly suitable, in particular, because it acts in a low-friction manner during the adjustment of the adjusting spindle.

Each adjusting spindle preferably has a plurality of axial guides which are preferably arranged at an identical angular spacing from one another and on which in each case at least one positively locking element is guided.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
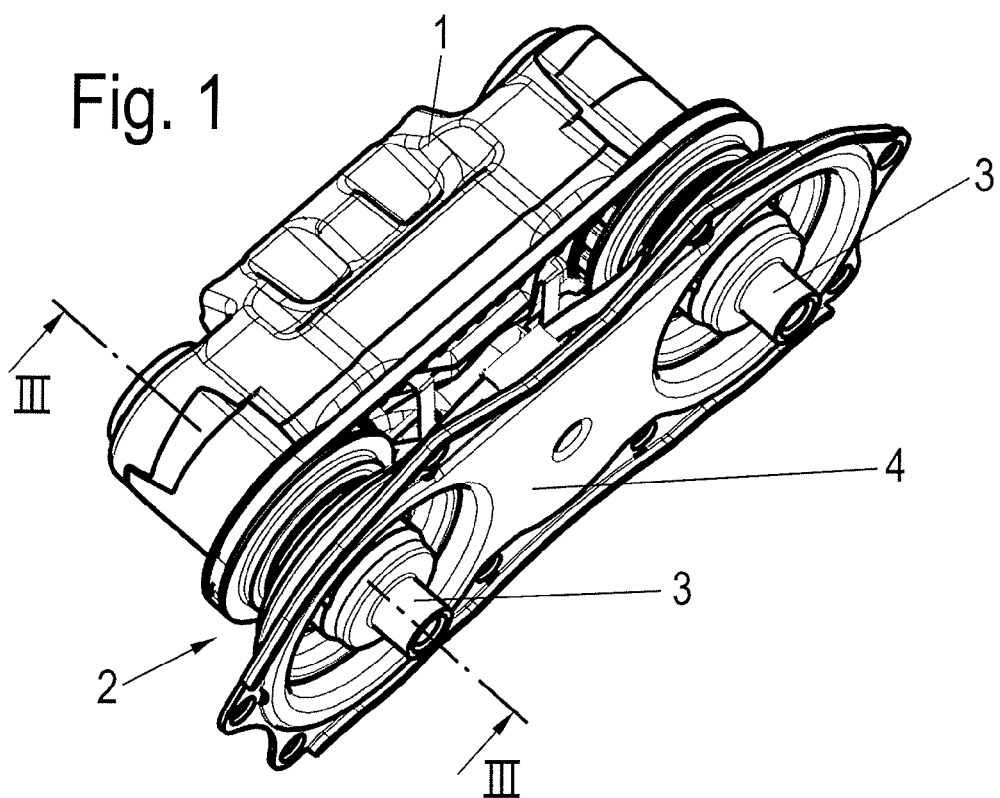
FIG. 1 is a perspective view of part of a disc brake according to an exemplary embodiment of the invention.

The figures show a bridge 1 as a part of a brake application device of a disc brake for a commercial (utility) vehicle, which bridge 1 can be positioned in a brake caliper of the disc brake. By way of the bridge 1, brake pads can be pressed onto a brake disc.

To this end, two adjusting spindles 3, which are arranged parallel to and at a spacing from one another, are held in the bridge 1, at one end of which pressure pieces are mounted. Via the pressure pieces, the brake pads can be pressed onto the brake disc during a displacement of the brake application device.

An axial adjustment of the adjusting spindles 3 in order to compensate for a wear-induced change in an air gap between the brake pad and the brake disc is possible via a wear adjusting device, which is positioned in the brake caliper. To this end, the adjusting spindles 3 and the associated bores of the bridge 1 are provided with threads 5 which mate threadingly with one another. The result is that, during the actuation of the wear adjusting device, the adjusting spindles 3 are moved axially in the direction of the brake pad by way of rotation of the adjusting spindles 3.

In order to ensure uniform adjustment of both adjusting spindles 3, a synchronizing device 2 is provided, having a traction mechanism drive, consisting of two drive wheels 6 and a traction mechanism 7, in each case one drive wheel 6 being held on the adjusting spindle 3 such that it cannot rotate and being held in an axially secured manner at a bearing point of the bridge 1.

The drive wheels 6 are arranged on that side of the bridge 1 which faces the brake pad, a closure plate 4 closing the interior of the brake caliper in the passage region of the adjusting spindles 3. A bellows 19 is connected to the closure plate 4 in order to seal the passage region, which bellows 19 bears with a sealing face against the adjusting spindle 3 and carries a seal 14 with integrally molded tongues 20 opposite the drive wheel 6.

Each of the adjusting spindles 3 has axial guides on the outer side, in the example in the form of axial grooves 11, in which in each case at least one positively locking element 10 of the associated drive wheel 6 lies. Here, the positively locking element 10 consists of a ball, which is held in a freely rotatable manner in the drive wheel 6 and in the axial groove 11. In the design variant which is shown, three axial grooves 11 are provided in each adjusting spindle 3, which axial grooves 11 are arranged offset with respect to one another at an angle of 120°.

Figure 3:
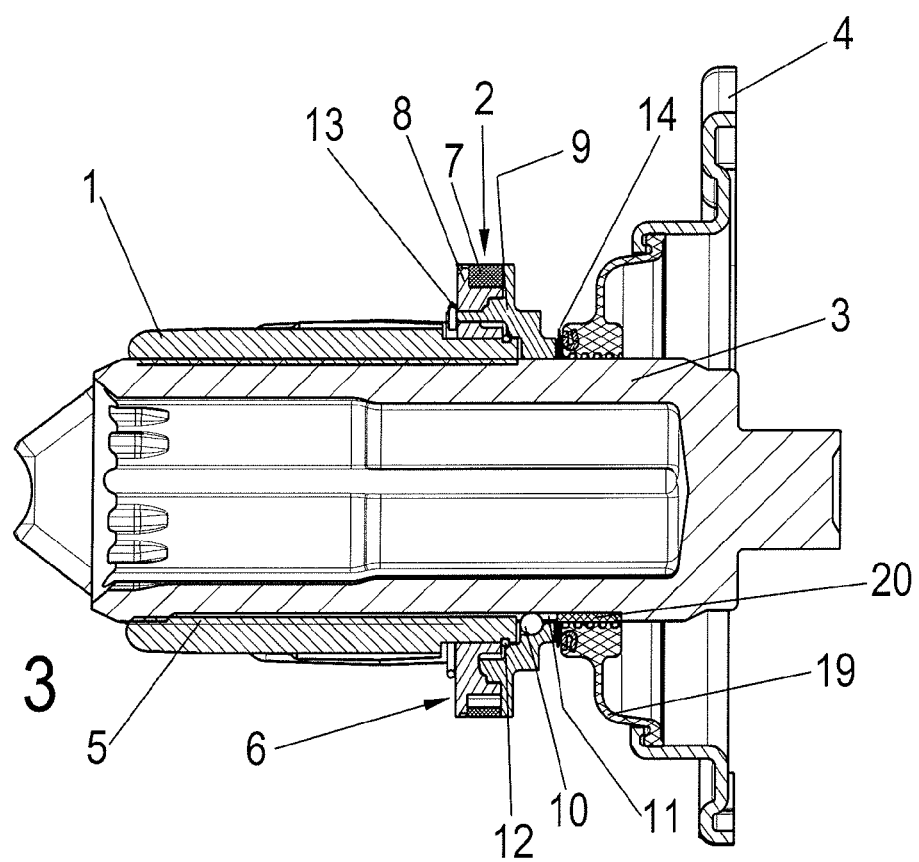
FIG. 3 is a section view through the part of the disc brake according to the line III-III in FIG. 1.
Figure 2:
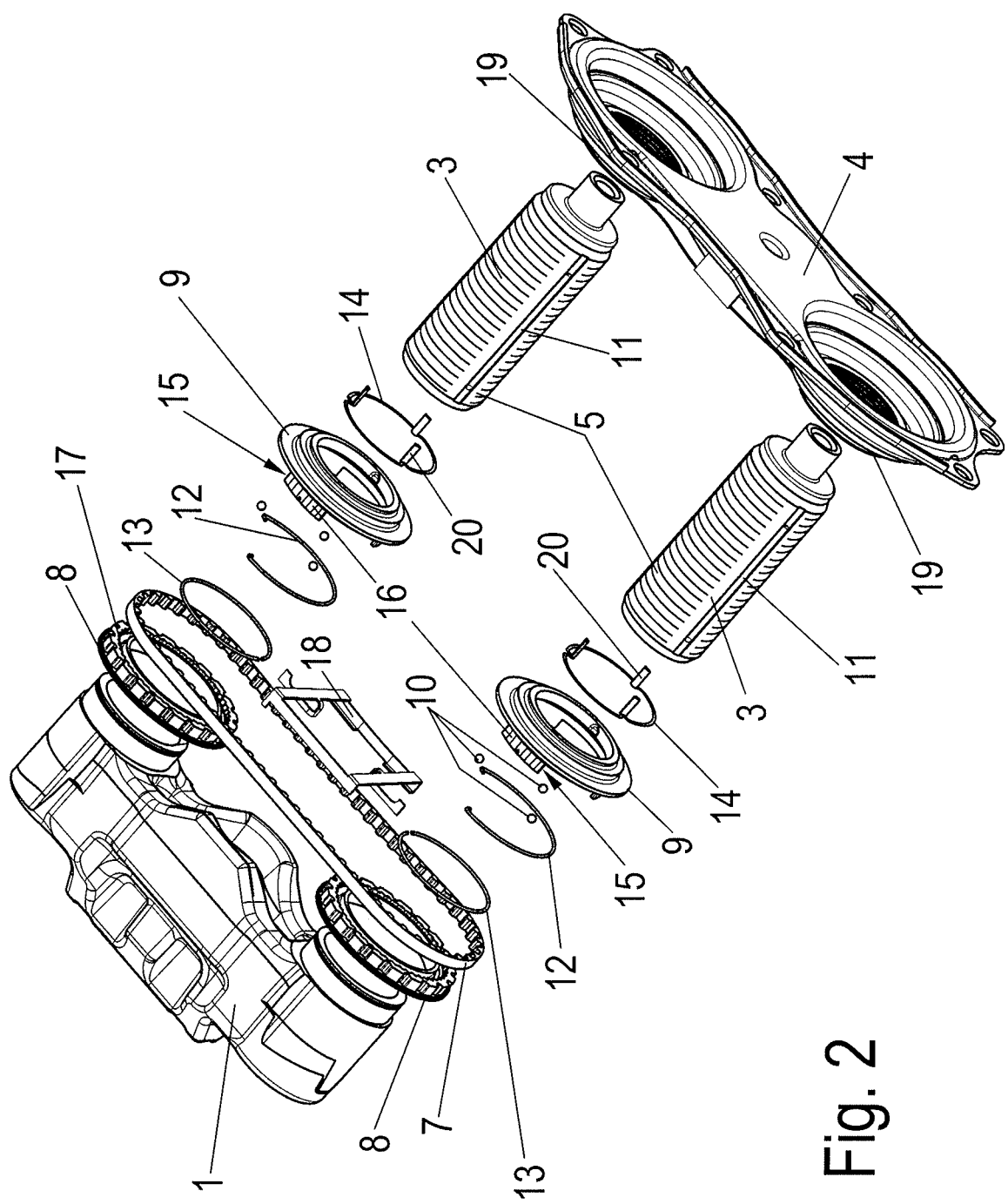
FIG. 2 is an exploded illustration showing the part according to FIG. 1.

As can be seen very clearly, in particular in FIG. 3, the drive wheel 6 is configured in two pieces and consists of an inner wheel 9, in which the positively locking elements 10 are held, and an outer wheel 8, into which the traction mechanism 7 engages in a positively locking manner.

The inner wheel 9 has axially projecting brackets 15 which are distributed uniformly over the circumference, in each case with an external toothing system 16 (FIG. 3). The external toothing systems 16 engages into an internal toothing system 17 of the outer wheel 8, with the result that very accurate setting of the adjusting spindles 3 with respect to one another is possible during pre-assembly of the synchronizing device 2.

In order to secure the drive wheel 6 against axial displacement, both a bearing clamping ring 13 is provided on that end side of the drive wheel 6 which faces away from the inner wheel 9 and a clip 12 is provided so as to lie opposite it, which clip 12 is held in a positively locking manner on the bridge 1 and acts on the drive wheel 6.

The abovementioned tongues 20 of the seal 14 lie sealingly in each case, in one axial groove 11.

The traction mechanism 7 is held under stress by way of a tensioner 18, which bears against at least one run section of the traction mechanism 7.

LIST OF DESIGNATIONS

1 Bridge
2 Synchronizing device
3 Adjusting spindle
4 Closure plate
5 Thread
6 Drive wheel
7 Traction mechanism
8 Outer wheel
9 Inner wheel
10 Positively locking element
11 Axial groove
12 Clip
13 Clamping ring
14 Seal
15 Bracket
16 External teeth
17 Internal teeth
18 Tensioner
19 Bellows
20 Tongue The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A disc brake for a commercial vehicle, comprising:
a brake caliper adapted to engage over a brake disc;
a brake application device arranged in the caliper for pressing brake pads onto the brake disc;
a bridge of the brake application device;

two adjusting spindles being threadedly mounted in bore holes of the bridge, the two adjusting spindles being arranged parallel to and spaced apart from one another;

a wear adjusting device positioned in the caliper and being configured to substantially compensate for a wear-induced change in an air gap between the brake pad and the brake disc via an axial adjustment of the two adjusting spindles;

a synchronizing device having a traction mechanism drive, by which the two adjusting spindles are synchronously adjusted, wherein the traction mechanism drive comprises a traction mechanism acting in a force-transmitting manner on drive wheels that are in an operative connection with the adjusting spindles for conjoint rotation therewith, each drive wheel has at least one positively locking element that acts on an outer-side axial guide of an associated adjusting spindle, wherein each drive wheel is configured of two separate pieces comprising an outer wheel and an inner wheel, and the inner wheel comprises brackets having an external toothing system, the external toothing system engaging into an internal toothing system of the outer wheel.

2. The disc brake according to claim 1, wherein each adjusting spindle includes a plurality of axial guides arranged at an equal angular spacing about the adjusting spindle.

3. The disc brake according to claim 1, wherein the at least one positive locking element comprises a ball or a feather key.

4. The disc brake according to claim 2, wherein the at least one positive locking element comprises a ball or a feather key.

5. The disc brake according to claim 1, wherein the outer-side axial guide is configured as an axial groove or guide face.

6. The disc brake according to claim 1, wherein the internal toothing system and the external toothing system have a smaller tooth spacing than a further toothing system of the drive wheel that is in engagement with the traction mechanism.

7. The disc brake according to claim 1, wherein the synchronizing device is arranged on a side of the bridge which, in use, faces the brake pad.

8. The disc brake according to claim 1, wherein each drive wheel is mounted on the bridge in a rotatable but axially secured manner.

9. The disc brake according to claim 1, further comprising a seal arranged between each drive wheel and a closure cover or a bellows connected with the closure cover.

10. The disc brake according to claim 9, wherein the seal comprises tongues lying sealingly in radial grooves of the adjusting spindles.

11. A disc brake for a commercial vehicle, comprising:
a brake caliper adapted to engage over a brake disc;
a brake application device arranged in the caliper for pressing brake pads onto the brake disc;
a bridge of the brake application device;
two adjusting spindles being threadedly mounted in bore holes of the bridge, the two adjusting spindles being arranged parallel to and spaced apart from one another;
a wear adjusting device positioned in the caliper and being configured to substantially compensate for a wear-induced change in an air gap between the brake pad and the brake disc via an axial adjustment of the two adjusting spindles;
a synchronizing device having a traction mechanism drive, by which the two adjusting spindles are synchronously adjusted, wherein
the traction mechanism drive comprises a traction mechanism acting in a force-transmitting manner on drive wheels that are in an operative connection with the adjusting spindles for conjoint rotation therewith,
each drive wheel has at least one positively locking element that acts on an outer-side axial guide of an associated adjusting spindle,
wherein each drive wheel is configured in two separate pieces comprising an outer wheel and an inner wheel, the outer wheel and the inner wheel being held not to rotate with respect to one another not to rotate via a toothing system engaging into one another.

12. The disc brake according to claim 11, wherein the toothing system has a smaller tooth spacing than a further toothing system of the drive wheel that is in engagement with the traction mechanism.

\* \* \* \* \*